United States Patent

Ahmed et al.

[11] Patent Number: 5,946,346
[45] Date of Patent: Aug. 31, 1999

[54] METHOD AND SYSTEM FOR GENERATING A POWER CONTROL COMMAND IN A WIRELESS COMMUNICATION SYSTEM

[75] Inventors: Mansoor Ahmed, Haltom City; Louay Jalloul, Fort Worth; Kamyar Rohani, Grapevine, all of Tex.

[73] Assignee: Motorola, Inc., Schaumburg, Ill.

[21] Appl. No.: 08/946,210

[22] Filed: Oct. 7, 1997

[51] Int. Cl.[6] .................................................. H04B 1/38
[52] U.S. Cl. .......................................... 375/219; 455/522
[58] Field of Search ..................................... 375/219, 316, 375/200, 206, 227; 455/522; 370/342, 335, 522

[56] References Cited

U.S. PATENT DOCUMENTS

| | | | |
|---|---|---|---|
| 5,416,797 | 5/1995 | Gilhousen et al. | 375/205 |
| 5,619,524 | 4/1997 | Ling et al. | 375/200 |
| 5,771,461 | 6/1998 | Love et al. | 455/522 |
| 5,835,847 | 11/1998 | Gilmore et al. | 455/12.1 |

Primary Examiner—Tesfaldet Bocure
Attorney, Agent, or Firm—L. Bruce Terry

[57] ABSTRACT

In a wireless communication system using a power control command to control power of a transmitted traffic channel (58), a signal from a transmitter (64) is received (104) via a channel. A channel quality is measured (70, 108) using the signal from the transmitter. In response to the measured channel quality (70) exceeding (80, 110) a channel quality threshold (82), a decrease traffic channel power command is sent (112) to the transmitter, and a channel quality threshold is increased (114). In response to the channel quality threshold (82) exceeding (80, 110) the measured channel quality (70), an increase traffic channel power command is sent (116) to the transmitter, and the channel quality threshold is decreased (118). A traffic signal quality may be measured (72) and compared (88) to a traffic signal quality threshold (86). The result of the comparison (132) may be used to adjust (134) the channel quality threshold (82). The traffic signal quality threshold may be adjusted (90, 126, 128) in response to whether or not a frame error is detected (74, 124).

18 Claims, 9 Drawing Sheets

METHOD AND SYSTEM FOR GENERATING A POWER CONTROL COMMAND IN A WIRELESS COMMUNICATION SYSTEM

FIELD OF THE INVENTION

The present invention is related in general to wireless communications systems, and more particularly to an improved method and system for generating a power control command to control power of a traffic channel in a wireless communications system.

BACKGROUND OF THE INVENTION

In many wireless communications systems, and especially in cellular communication systems, it is important to control the transmitted power of a traffic channel in order to reduce cochannel interference. Cochannel interference is generated by other transmitters assigned to the same frequency band as the desired signal. And because all users transmit traffic on the same carrier frequency in a code division multiple access (CDMA) cellular system, reducing cochannel interference in CDMA systems is especially important because it directly impacts system capacity. If the cochannel interference is reduced, the CDMA system capacity may be increased. Therefore, it is a design goal to transmit a traffic signal with only an amount of power necessary to provide acceptable signal quality at the receiver, after it passes through the channel.

In this document, a "channel" may be defined as a path or paths of communication through a medium between a transmitter and a receiver. If the medium is air and communication takes place with radio frequency (RF) signals, such a channel is typically affected by fading, which is discussed in greater detail below. A "traffic channel" may be defined as a channel that carries data, whether representing voice or other information generated by the user, which the user intends to transmit via the channel. The traffic channel may be distinguished from other channels used by the communication system that may be used to transmit timing, control, or other information supporting system operation.

Power control systems in cellular communication systems should compensate not only for signal strength variations due to the varying distance between the base station and the subscriber unit but should also attempt to compensate for channel quality fluctuations typical of a wireless channel. These fluctuations are due to the changing propagation environment between the transmitter, or base station, and the receiver, or subscriber unit, as the user moves in the service area.

There are two main groups of channel quality fluctuations: slow fading (i.e., shadowing) and fast fading. Shadowing occurs as the subscriber unit moves over uneven terrain, or travels into a propagation shadow behind a building or a hill or other obstacle much larger than the wave length of the frequency of the wireless channel. Fast fading occurs when electromagnetic waves transmitted from the transmitter follow multiple paths on the way from the transmitter to the receiver. The different paths have different delays and interfere at the antenna of the receiver. If two paths have the same propagation attenuation and their delay differs in an odd number of half-wave lengths (half-periods), the two waves may cancel each other at the antenna completely. If the delay is an even multiple of the half-wave lengths, the two waves may constructively add, resulting in a signal of double amplitude. The fluctuation of the channel gain between these two extremes is called fading.

Since the scattering and reflecting surfaces in a service area are randomly distributed, the amplitude of the resulting signal is also a random variable. The amplitude of fading is usually described by a Rayleigh, Rice, or Nakagami distributed random variable.

Since the subscriber unit may move at the velocity of a moving car or even of a fast train, the rate of channel fluctuations may be quite high and the power control has to react very quickly in order to compensate for the rapid fluctuations. The rate of fading is usually expressed in terms of Doppler frequency.

Existing power control systems used in CDMA cellular systems that operate according to J-STD-008, published by the Joint Technical Committee on Wireless Access, use the measurement and reporting of cyclic redundancy check (CRC) errors at the subscriber unit to control the power of the traffic channel at the base unit. This method of power control in response to CRC errors is used to implement a slow "ramping" power control scheme. The "ramping" occurs because the traffic channel power is increased by a relatively large amount when the subscriber unit reports a CRC error. After the large power increase, which often eliminates the CRC errors for some subsequent period, the power is reduced by a relatively small amount for each subsequent frame transmitted. Eventually, the power is reduced to a point where another CRC error occurs, and the power is once again increased by a relatively large amount. If channel quality remains constant, a graph of power transmitted in the traffic channel resembles a saw tooth, with large power increases followed by a series of small power decreases.

One problem with this method of power control is the delay encountered between the degradation of channel quality and the request for a power increase and the subsequent actual increase in power. The delay in requesting a power increase is caused by waiting for a frame to be received, and then waiting for frame decoding and the detection of a cyclic redundancy check error. Once the CRC error is detected, it must be reported to the base station, and the base station must respond by increasing traffic channel power. In current CDMA systems, it takes 20 milliseconds (mS) to receive a frame. Thus, the rate at which CRC reports or power control commands are sent to the transmitter is 50 Hz. This delay in the power control loop periodically causes the base to transmit too much power on the traffic channel, such as when a relatively large increase in power is requested and granted just as the channel quality has reached a minimum and starts to improve. If the traffic channel has too much power, cochannel interference increases and system capacity decreases.

With reference now to FIG. 1, there is depicted a set of graphs that illustrate a prior art method of controlling traffic channel transmit power, and the relationships between channel quality, traffic channel transmit power, and received frame quality. As illustrated, FIG. 1 includes channel quality graph 20, traffic channel transmit power graph 22, and received frame quality graph 24. The x-axis of each of these graphs shows frame numbers, which correspond to 20 mS units of time. The y-axis of channel quality graph 20 is a signal-to-noise ratio, expressed as $E_b/N_t$. The y-axis of traffic channel transmit power graph 22 is power in dB relative to the maximum power available at the transmitter. The y-axis of received frame quality graph 24 is also signal-to-noise ratio, $E_b/N_t$. A 20 mS frame duration is shown at reference numeral 26.

As shown in graph 20 at time 28, channel quality has begun to decline. In response to this channel quality decline, the received frame quality is also declining, as shown at time 28. Eventually, received frame quality becomes low enough to cause a CRC error. The error is reported to the base station, and the base station responds by increasing the power by a relatively large amount, as shown in graph 22.

It should be noted here that the delay between detecting a need for an increase in transmit power and the actual increase in transmit power is not shown in graphs 20–24. Thus, these graphs show an increase in transmit power at the same time the need for the increase in power is detected. The delay between detection and power increase actually experienced in the prior art method increases the likelihood that transmitted power will exceed the power necessary for a desired frame quality at the subscriber unit.

Problems with the prior art are further illustrated at time 30, where a relatively large increase in power is requested and granted just as channel quality reaches a minimum and starts to increase. Increases in transmit power when the channel quality is increasing causes an excess in transmitted power. Following time 30, the power is decreased by relatively small amounts, thereby forming the sawtooth wave form.

In order to improve control of transmitted power, it has been proposed that power control commands be sent from the receiver to the transmitter at a rate greater than 50 Hz. By sending power control commands from the receiver more often, the amount of power change requested can be smaller, and the system can respond more quickly to changes in channel quality. This reduces the likelihood of a request for an increase in power for the next 20 mS frame just as the channel quality begins to increase.

However, new problems arise in systems that attempt to control power faster than the 50 Hz frame rate. For example, the power control metric in an IS-95 CDMA system is the detection of a CRC error. This is a problem because CRC errors cannot be detected based upon the receipt of a partial frame. If power is to be controlled at a frequency greater than 50 Hz, then a new metric for determining whether or not to increase or decrease power is needed. This new metric should be measured at the higher rate at which power control commands are sent to the transmitter. Furthermore, it is difficult to measure any metric related to the traffic channel because the transmission rate of the traffic channel is not known until an entire 20 mS frame is received and decoded.

In a CDMA system which decodes frames to check for CRC errors, frames may be decoded using a Viterbi decoder, which is a maximum likelihood sequence estimator. Before CDMA signal samples are input into the Viterbi decoder, the samples are calibrated, or weighted, according to a complex weighting coefficient derived from the amplitude and phase of the pilot signal. The purpose of the complex weighting coefficient is to compensate the symbols for the phase rotations introduced by the channel. Furthermore, the weighting adjusts the gain of the symbols according to the gain variations in the channel.

Because, in a prior art IS-95 CDMA system, the transmitted traffic channel power at the transmitter does not change over the duration of a 20 mS frame, the complex weighting coefficient may be calculated by analyzing the phase and gain of only the pilot signal.

With reference now to FIG. 2, there is depicted a prior art circuit for generating a complex weighting coefficient for use in a maximum likelihood decoder. As illustrated, traffic channel demodulator 31 includes antenna 32, which receives radio frequency CDMA signals. After receiving the signals, the signals are down converted by removing the carrier (not shown) and coupled to despreaders 34 and 36. Despreader 34 despreads a pilot signal using Walsh code 0. Despreader 36 despreads the traffic channel using a traffic channel Walsh code assigned by the CDMA system.

After despreading the pilot signal, the despread output is filtered, as shown by finite impulse response filter 38. Filter 38 reduces noise that remains following the despreading operation.

The output of filter 38 is then coupled to complex conjugate function circuit 40, which changes the sign of the imaginary part of the pilot signal.

The output of complex conjugate function circuit 40 is the complex weighting coefficient, $\hat{e}^{j\Theta}$, which is then multiplied by the despread traffic channel signal from despreader 36, as shown at multiplier 42. Thus, the output of multiplier 42 is a despread traffic channel signal that has been compensated for the gain and phase effects of the channel.

The output of multiplier 42 may contain some noise having an imaginary component, which is removed by circuit 44. The output of traffic channel demodulator 31 is a demodulated traffic channel signal comprising traffic channel symbols. The demodulated traffic channel symbols are then coupled to deinterleaver and decoder 46.

Deinterleaver and decoder 46, which decodes a frame of symbols that are represented by real numbers, is coupled to the output of circuit 44 for decoding frames. The decoder may be implemented with a Viterbi decoder.

In some instances, the demodulator shown in FIG. 2 does not generate the best complex weighting coefficients for a system that varies the transmit power of the traffic channel. This is because complex weighting coefficients generated from the pilot signal alone do not reflect a recent change in traffic channel power—the quantity for which a power control system exists to control. That is, the controller needs an accurate and immediate measurement of the quantity it is controlling.

Therefore, it should be apparent that there is a need for an improved method and system for controlling traffic channel transmit power in a wireless communications system, and especially in a CDMA cellular system. The improved power control method and system should minimize excess power transmitted in the traffic channel, generate power control commands at a rate greater than known power control systems, and use a metric that can be measured several times during the reception of a frame, wherein each measurement can be made after receiving only a portion of a frame.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 3:
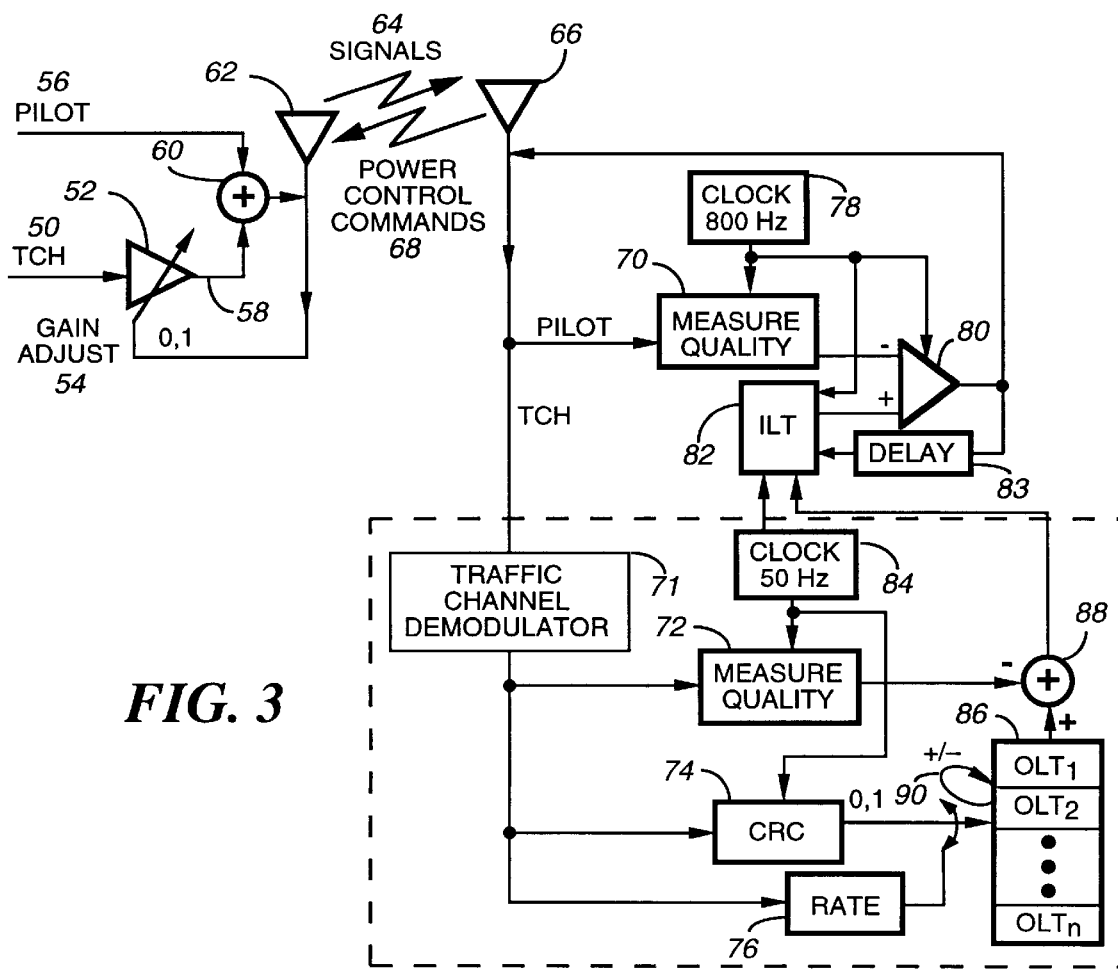
FIG. 3 is a high-level block diagram of the system for generating a traffic channel power control command according to the method and system of the present invention.

With reference now to the figures, and in particular with reference to FIG. 3, there is depicted a high-level block diagram of the system for generating a power control command to control power of a traffic channel in accordance with the present invention. As is shown, traffic channel signal 50 is coupled to variable gain amplifier 52. Variable gain amplifier 52 receives a gain adjust signal 54 that causes a gain increase or a gain decrease. Gain adjust signal 54 may be a binary signal having a first value for incrementally increasing gain and a second value for incrementally decreasing gain.

A pilot signal 56, which is transmitted at a constant power, and the amplified traffic channel signal 58 are combined in combiner 60 to form a signal that is coupled to base antenna 62 for RF transmission.

In the example shown in FIG. 3, and described throughout this document, the transmitter of the traffic channel signal is referred to as a base station. However, the method and system of the present invention may be used between any transmitter and receiver, whether the transmitter is a base station or a subscriber unit.

Signals 64 are radio frequency signals that include both pilot signal 56 and amplified traffic channel signal 58, wherein both are modulated on the same carrier signal.

Subscriber antenna 66 is used to receive signals 64 and transmit power control command signals 68. Signals 64 that travel from base antenna 62 to subscriber antenna 66, and power control command signals 68 that travel from subscriber antenna 66 to base antenna 62, both travel through a channel with a medium of air. It should be noted that signals 64 are affected by the channel quality, which changes due to distance, interference, noise, shadowing, fading, or other phenomena that affects a propagating radio frequency signal. The purpose of a power control system is to ensure that signals 64 are adequately received at subscriber antenna 66 after propagating through a channel having a varying channel quality. Signals 64 should not be transmitted with a power, or other signal characteristic, greater than necessary to adequately receive traffic channel signal 50 at the subscriber unit.

Signals received in the subscriber unit by antenna 66 are coupled to pilot signal quality measurement circuit 70, and following traffic channel demodulator 71, coupled to traffic signal quality measurement circuit 72, CRC error detector 74, and rate detector 76. Pilot signal quality measurement circuit may be implemented with a circuit that measures the signal-to-noise ratio of the pilot signal. In a CDMA cellular system, signal-to-noise may be expressed as $E_b/N_t$, or the ratio of the energy per bit to the total signal noise, where the total noise includes interference from other sectors, self interference due to multipath, and thermal noise.

Pilot signal quality measurement circuit 70 is coupled to clock 78, which preferably operates at 800 Hz, or 16 times the frame rate of an IS-95 CDMA system. Pilot signal quality measurement circuit 70 is described in greater detail with reference to FIG. 7, below.

Clock 78 is also coupled to comparator 80, which compares the output of pilot signal quality measurement circuit 70 to an inner-loop threshold 82. Inner-loop threshold 82 may also be referred to as a channel quality threshold. The output of comparator 80 is coupled to inner-loop threshold 82 in order to update or increment inner-loop threshold 82 in response to the comparisons, which are made at the rate set by clock 78.

The update to inner-loop threshold 82 is made in order to compensate for an expected change in traffic channel transmit power at the transmitter. The power control command is output by comparator 80 and sent to the transmitter as shown at reference numeral 68. Because there is a delay between the generation of a power control command and an actual increase in traffic channel power as a result of the command, the update of inner-loop threshold 82 may be delayed in order to synchronize the actual transmit power change with the update of the inner-loop threshold, which has been updated because of the power change. Thus, the purpose of delay 83 is to synchronize the update with the change in transmit power.

Traffic signal quality measurement circuit 72 receives a down converted and demodulated traffic channel signal from subscriber antenna 66 and traffic channel demodulator 71. The output of clock 84 is coupled to traffic signal quality measurement circuit 72 for controlling the rate of quality measurements. Clock 84 is preferably a 50 Hz clock, which coincides with the frame rate of an IS-95 CDMA system. Traffic signal quality measurement circuit 72 may be implemented with a circuit that measures the signal-to-noise ratio, $E_b/N_t$, of a frame.

CRC error detector 74 is also coupled to the output of traffic channel demodulator 71 in order to detect a CRC error in a frame of traffic channel data.

Rate detector 76 is used to detect the data rate of traffic channel signal 50 over a frame. Rate detector 76 may be implemented by decoding traffic channel signal 50 at all permitted rates and determining that the rate transmitted was the rate that decoded correctly.

Outer-loop threshold table 86 is used to store and recall a selected outer-loop threshold, wherein stored thresholds correspond to a data rate of traffic channel signal 50. In a preferred embodiment, outer-loop threshold table 86 contains four outer-loop thresholds: one for full-rate data, one for half-rate data, one for quarter-rate data, and one for eighth-rate data. Note that the outer-loop threshold may also be referred to as a traffic signal quality threshold.

The output of rate detector 76 is used to select the proper outer-loop threshold in outer-loop threshold table 86. The selected rate is coupled to summer 88. Summer 88 calculates a signed difference between the selected outer-loop threshold from outer-loop threshold table 86 and a value representing the quality of the traffic channel, as measured by traffic signal quality measurement circuit 72. This signed difference is used to adjust inner-loop threshold 82 at the rate of clock 84, which in a preferred embodiment is 50 Hz.

As shown at outer-loop threshold adjustment 90, outer-loop thresholds in outer-loop threshold table 86 are recalled, incrementally adjusted, and replaced in the table according to the output of CRC error detector 74. If a CRC error is detected, the outer-loop threshold for the frame rate received is incrementally increased; if a CRC error is not detected, the rate-selected outer-loop threshold is incrementally decreased. Threshold increases may be several times larger than threshold decreases.

Figure 4:
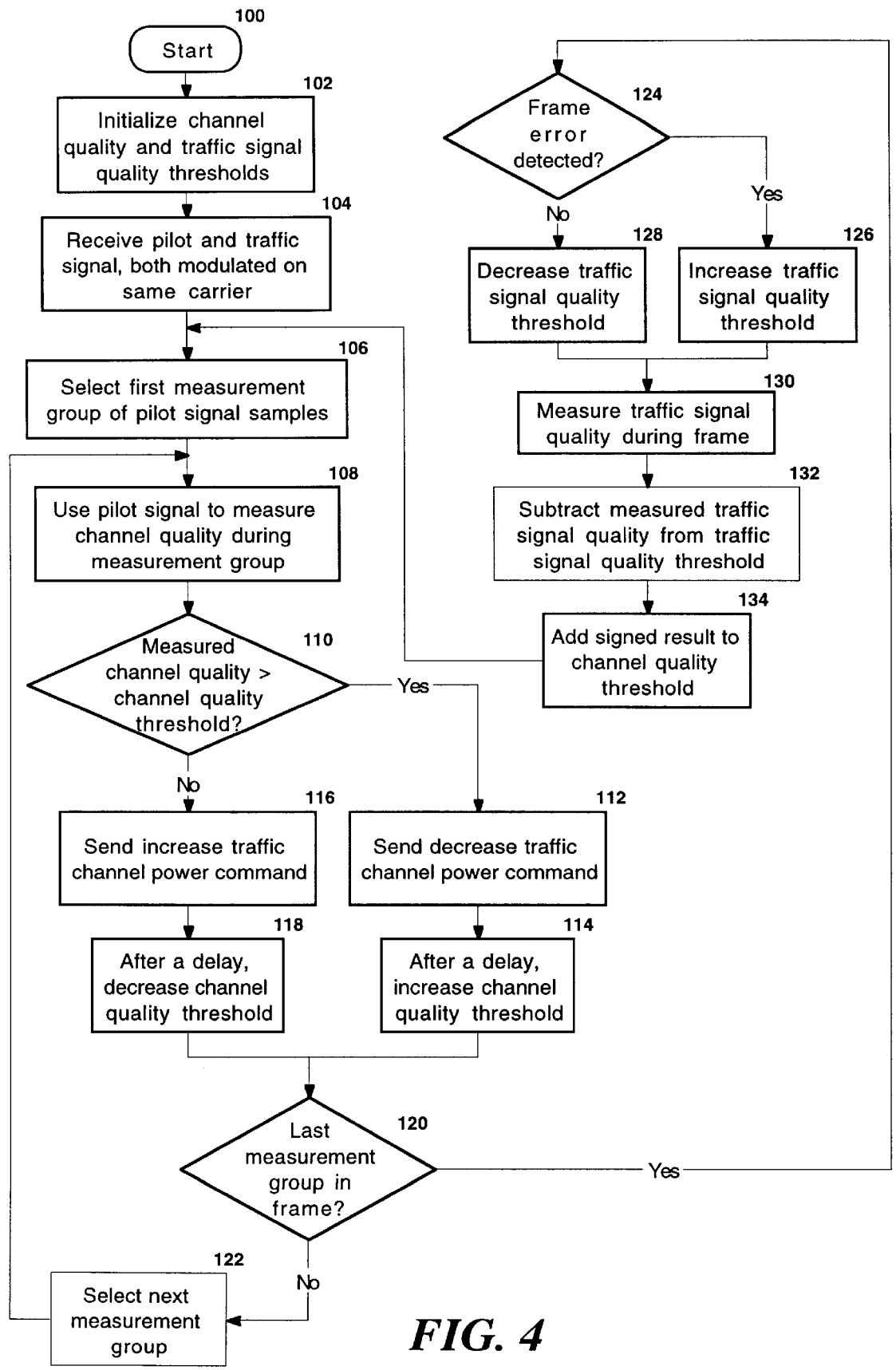
FIG. 4 is a high-level logic flowchart that illustrates the method of generating a power control command to control the transmitted power of traffic channel in accordance with the method and system of the present invention.

With reference now to FIG. 4, there is depicted a high-level logic flowchart that illustrates the method of generating a power control command to control the transmitter power of a traffic channel in accordance with the method and system of the present invention. As illustrated, the process begins at block 100 and thereafter passes to block 102, wherein a channel quality threshold and a traffic signal quality threshold are initialized. Note that the channel quality threshold corresponds to the inner-loop threshold 82 discussed with reference to FIG. 3, and the traffic signal quality threshold corresponds to the outer-loop threshold, which is selected from outer-loop threshold table 86 in FIG. 3. Next, as illustrated at block 104, the pilot and traffic signal are received by the subscriber unit, wherein the signals are received via a channel, and both signals are modulated on the same carrier.

After receiving the signals, the process selects a first measurement group of data that represents samples of the pilot signal, as depicted at block 106. In a preferred embodiment, the measurement group is one-sixteenth of a frame, which means measurement groups are received at 800 Hz in an IS-95-like system. Next, the pilot signal samples in the selected measurement group are used to measure the channel quality for the duration of the selected measurement group, as illustrated at block 108. Measurement of channel quality is discussed below with reference to FIGS. 7 and 8.

After measuring the channel quality, the process compares the measured channel quality to the channel quality threshold, as depicted at block 110. If measured channel quality exceeds the channel quality threshold, the process sends a decrease traffic channel power command to the base station, as illustrated at block 112. Thereafter, the process increases the channel quality threshold by an amount corresponding to the requested increase in traffic channel power, as depicted at block 114. This increase in threshold may be delayed for a time sufficient for the transmitter to actually decrease the traffic channel transmit power.

If, at block 110, the measured channel quality does not exceed the channel quality threshold, the process sends an increase traffic channel power command to the base station, as illustrated at block 116. Thereafter, the process decreases the channel quality threshold by an amount corresponding the requested increase in traffic channel power, as depicted at block 118. This decrease in threshold may be delayed for a time sufficient for the transmitter to actually increase the traffic channel transmit power.

Following the transmission of the power control command and the adjustment to the channel quality threshold, the process determines whether or not the selected measurement group is the last measurement group in a frame, as illustrated at block 120. If the selected measurement group is not the last measurement group in the frame, the process selects the next measurement group, as depicted at block 122, and iteratively returns to block 108 to measure the channel quality again.

If all the measurement groups in the frame have been analyzed, which means an entire frame has been received, the process determines whether or not a frame error is detected, as illustrated at block 124. If a frame error is detected, the process incrementally increases the traffic signal quality threshold, as depicted at block 126. If a frame error is not detected, the process incrementally decreases the traffic signal quality threshold, as illustrated at block 128. In a preferred embodiment the increases are several times larger than the decreases in order to maintain a low frame erasure rate.

After adjusting the traffic signal quality threshold in response to a frame error, the process measures the traffic signal quality for an entire frame, as depicted at block 130. The measurement of traffic signal quality is discussed below with reference to FIG. 5. Note that the measurement of traffic signal quality may be conducted in parallel with the detection of a frame error, which is shown at block 124.

After measuring traffic signal quality, the process subtracts the measured traffic signal quality from the traffic signal quality threshold, and adds the signed result to the channel quality threshold, as illustrated at blocks 132 and 134. The signed result indicates the difference between actual frame quality and the desired frame quality, which is the channel quality threshold. Therefore, this correction eventually biases the traffic channel power transmitted, which makes the actual frame quality closer to the desired frame quality.

After adjusting the channel quality threshold, the process iteratively returns to select a first measurement group in the next frame, as shown at block 106.

The process depicted in FIG. 4 shows a fast-rate, inner control loop and a slow-rate, outer control loop. The inner-loop consist of blocks 106–122. The outer-loop consist of blocks 124–134. The inner-loop control attempts to adjust traffic channel power based upon detected variations in channel quality, wherein channel quality is measured using the pilot signal. The outer-loop control corrects the inner-loop power control by periodically adjusting the inner-loop based on the quality of the traffic channel over a frame duration. Note that the generation of power control commands by the inner-loop continues in parallel with the outer-loop, which analyzes the traffic signal quality.

Figure 5:
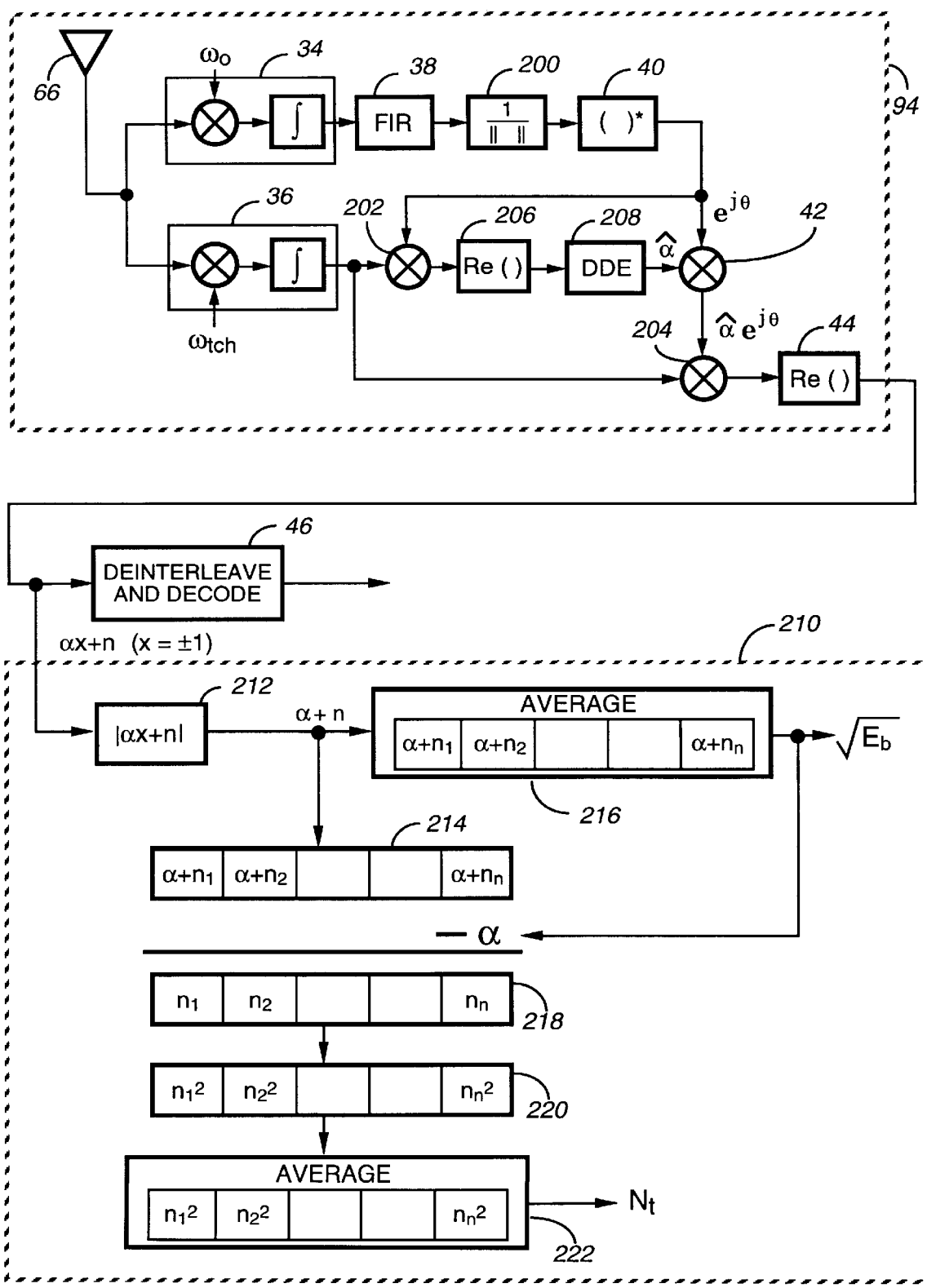
FIG. 5 is a block diagram of a circuit for calculating a traffic signal quality, and calculating a complex weighting coefficient used for demodulating the traffic channel signal, in accordance with the method and system of the present invention.

With reference now to FIG. 5, there is depicted a block diagram of a circuit for calculating traffic signal quality, and calculating a complex weighting coefficient used for demodulating the traffic channel signal, in accordance with the method and system of the present invention. In a preferred embodiment of the present invention, traffic signal quality is measured as the signal-to-noise ratio, $E_b/N_t$, of the traffic channel.

Generally, FIG. 5 shows traffic channel demodulator 94 coupled to decision directed estimator 210. The demodulator used to calculate traffic signal quality provides decision directed estimator 210 with demodulated traffic channel symbols. In a communications system having a higher-power traffic channel, wherein a ratio of traffic signal power to pilot signal power exceeds a selected threshold, traffic channel demodulator 94 is the preferred demodulator. It is preferred because it uses a complex weighting coefficient that accounts for changes in the traffic channel transmit power directed by the power control commands.

Figure 1:
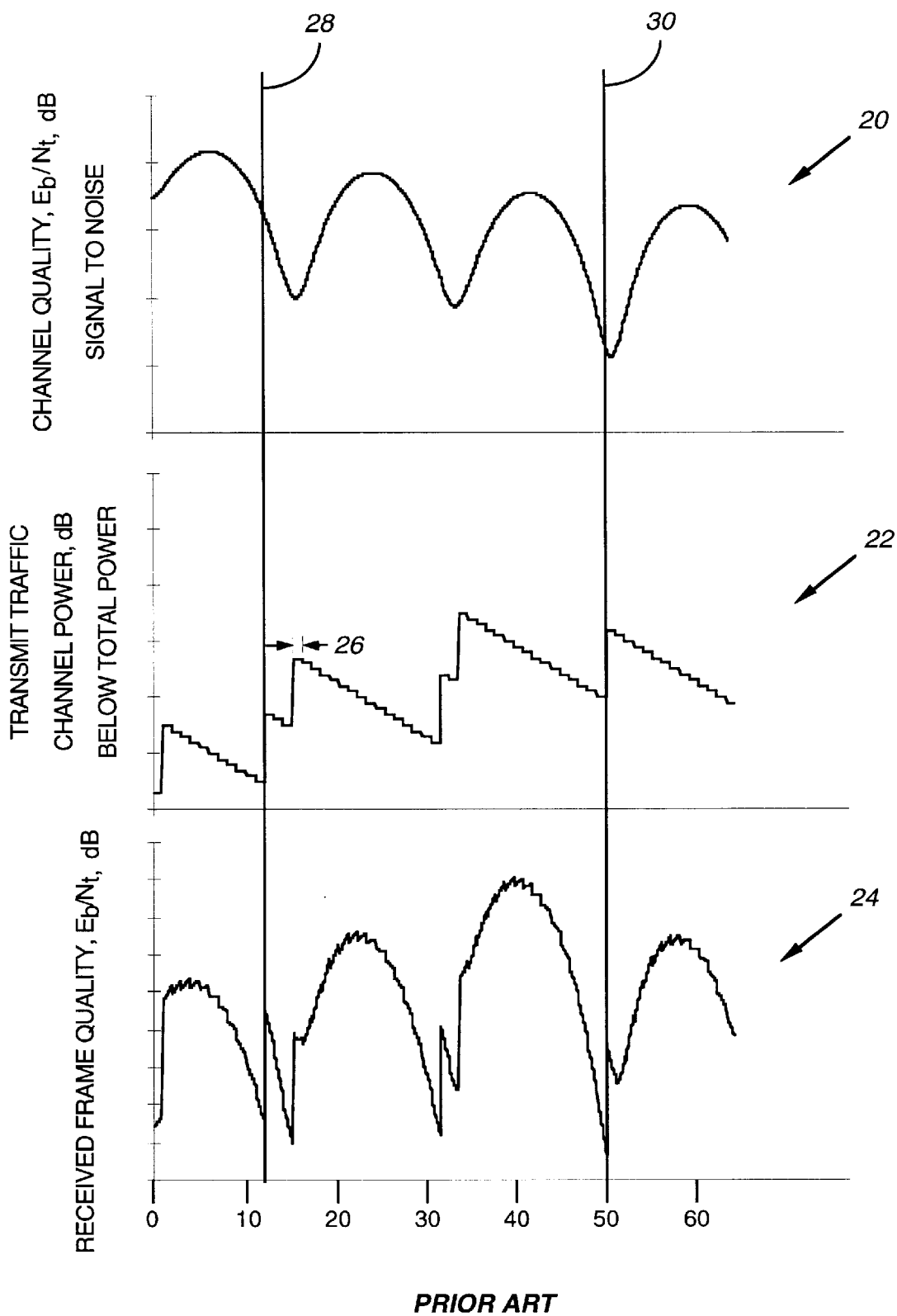
FIG. 1 depicts a set of graphs that illustrate a prior art method of controlling traffic channel transmit power, and the relationships between channel quality, traffic channel transmit power, and received frame quality.
Figure 2:
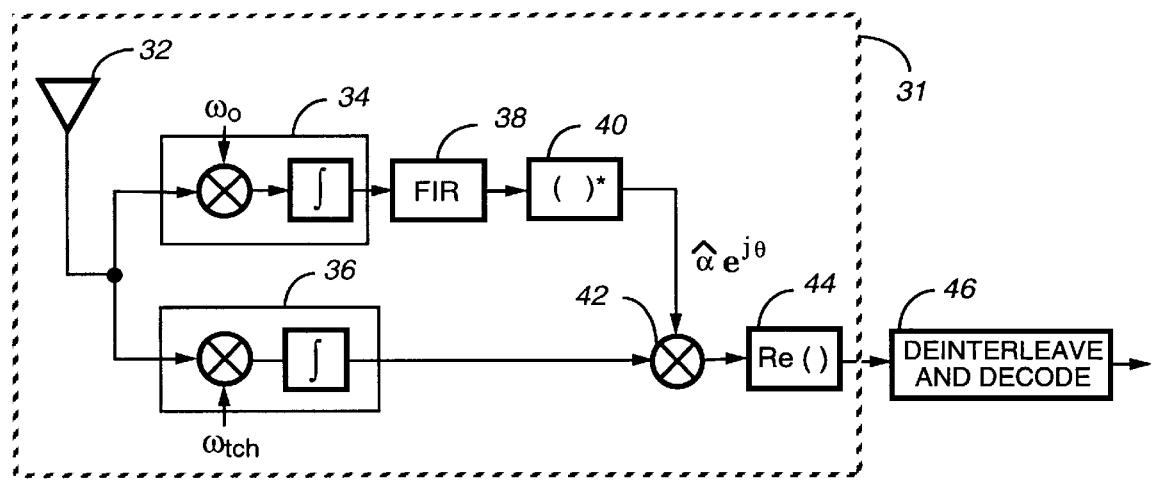
FIG. 2 is a high-level block diagram of a prior art circuit for generating a complex weighting coefficient for use in a maximum likelihood decoder.

However, in a communications system having a lower-power traffic channel, wherein the ratio of traffic signal power to pilot signal power falls below a selected threshold, traffic channel demodulator 31 is the preferred demodulator (see FIG. 2). In this case, the prior art demodulator is preferred because the performance of traffic channel demodulator 94 degrades when the traffic channel power is low.

As illustrated in traffic channel demodulator 94, antenna 66 receives CDMA signals, which are then down converted and coupled to despreaders 34 and 36. Despreader 34 despreads the pilot signal with Walsh code zero while despreader 36 despreads the traffic channel using a selected Walsh code.

After the pilot signal has been despread, filter 38 reduces noise that remains following the despreading operation. Filter 38 is preferably implemented with a finite impulse response filter.

The output of filter 38 is coupled to amplitude normalizing function 200, which sets the amplitude of the pilot signal to unity. Thereafter, complex conjugate function circuit 40 receives the unity amplitude pilot signal and changes the sign of the imaginary part. The output of circuit 40 is the phase portion of the complex weighting coefficient.

Referring again to block 36, the traffic channel is despread and coupled to multipliers 202 and 204. Multiplier 202 removes the phase change in the traffic signal that was induced by the channel.

Following the phase correction at multiplier 202, the real portion of the traffic signal is extracted by circuit 206 and coupled to decision directed estimator 208. The output of decision directed estimator 208 is proportional to the gain of the traffic channel, wherein the gain is affected by traffic channel transmit power and the quality of the channel. Decision directed estimator is described more completely with reference to FIG. 6.

The output of decision directed estimator 208 and the output of complex conjugate function circuit 40 are both coupled to multiplier 42 which forms the complex weighting coefficient used for demodulating the traffic channel signal. As shown, the traffic channel signal from despreader 36 is multiplied by the complex weighting coefficient at multiplier 204 to produce a traffic channel signal that has been compensated for the gain and phase effects of the channel and the change in transmit power at the transmitter.

After multiplying the traffic channel signal by the complex weighting coefficient at multiplier 204, the process extracts the real part of the weighted traffic signal at circuit 44. This insures that only real numbers are input into the decoder, which is shown at deinterleaver and decoder 46.

In order to calculate the signal-to-noise ratio for the traffic channel, the process couples the weighted traffic channel signal from circuit 44 to decision directed estimator 210. As shown, decision directed estimator 210 includes absolute value circuit 212 which removes the sign from the traffic channel symbols. The absolute value of the traffic channel symbols are then coupled to register 214 and averaging function 216. Register 214 temporarily stores a number of traffic channel symbols that comprise a measurement group. Note that the traffic channel symbols are represented as a soft bit plus a noise value.

Averaging function 216 averages the symbols in a measurement group and outputs a value that is proportional to the square root of $E_b$.

To calculate the total noise in the traffic channel, a value, $\alpha$, is subtracted from each of the traffic channel symbols in register 214 to produce a result shown in register 218. The value a is proportional to the square root of $E_b$. At this point, register 218 contains a measurement group of noise samples. The noise samples in register 218 are then squared to produce the result shown in register 220. Next, the squared noise values are averaged over the measurement group to produce a value proportional to $N_t$, as shown at register 222.

Figure 6:
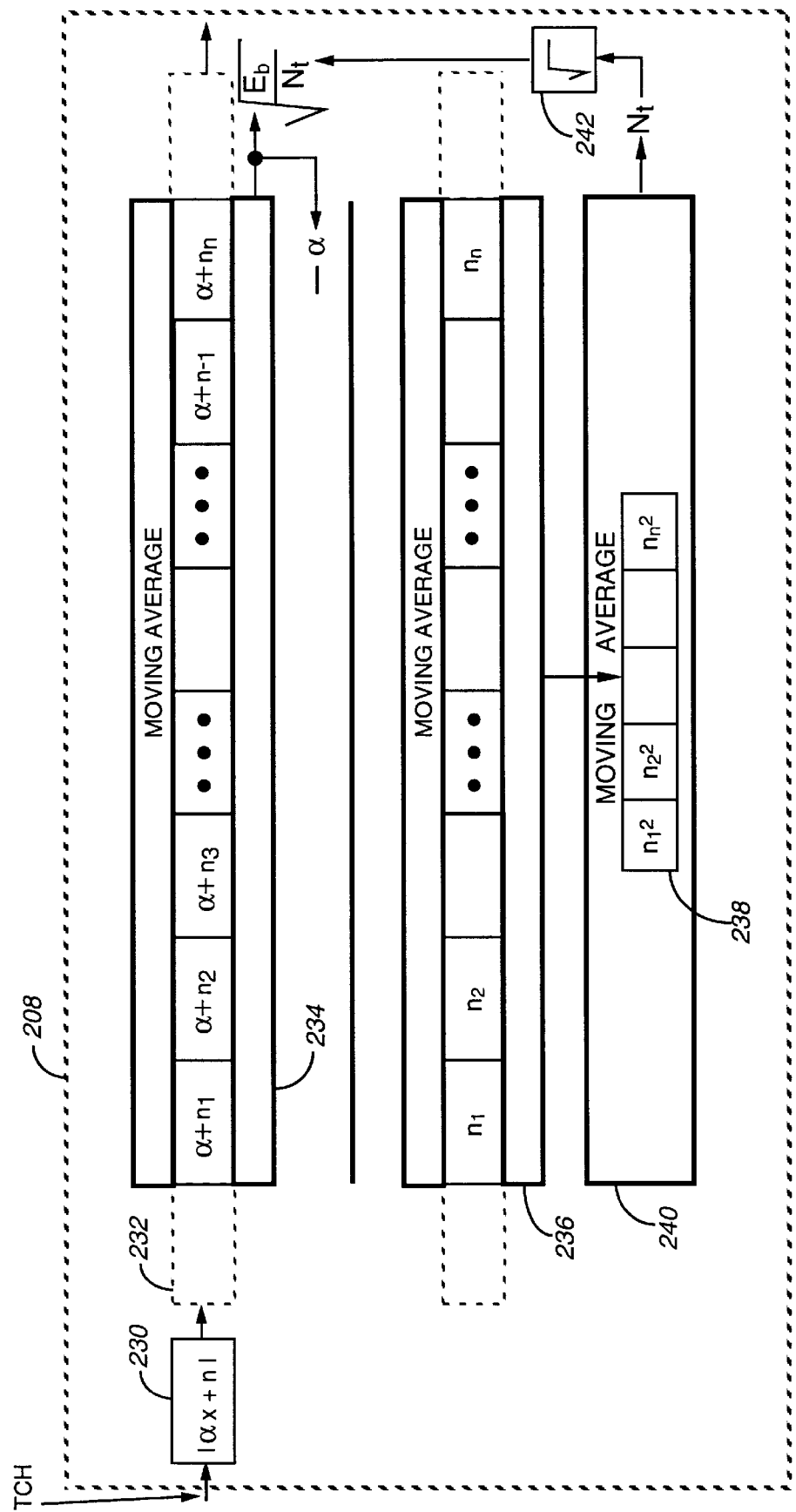
FIG. 6 is a more detailed block diagram of a decision directed estimator, such a decision directed estimator 208 in FIG. 5.

With reference now to FIG. 6, there is depicted a more detailed block diagram of a decision directed estimator, such as decision directed estimator 208 in FIG. 5. As illustrated, the real portion of weighted traffic channel symbols are input into absolute value circuit 230. Absolute value circuit 230 removes the sign from the symbols. The output of absolute value circuit 230 is coupled to first-in-first-out (FIFO) register 232, which temporarily stores a number of traffic channel symbols. Averaging circuit 234 is coupled to FIFO register 232 in order to calculate a moving average of the traffic channel gain, which is represented by the symbol $\alpha$.

Note that there is an output from decision directed estimator 208 for every traffic channel symbol because each symbol input into deinterleaver and decoder 46 is weighted by an individual estimate of the gain of the traffic channel. This traffic channel gain estimate is based upon several traffic channel symbols, as can be seen by the moving average calculation computed by averaging circuit 234. The number of traffic channel symbols used to estimate the gain may vary, which determines how responsive the traffic channel gain estimate will be. Using a smaller number of traffic channel symbols causes the gain estimate to be more responsive, while using a larger number of traffic channel symbols causes the gain estimate to respond more slowly to changes in traffic channel gain.

The traffic channel symbols used in averaging circuit 234 may be traffic channel symbols that were all received prior to the traffic channel symbol for which the complex weighting coefficient is being calculated. However, in a preferred embodiment, traffic channel symbols used in averaging circuit 234 contain symbols received both before and after the symbol for which the complex weighting coefficient is being calculated. In this preferred embodiment, a delay circuit will be needed between despreader 36 and multiplier 204 (see FIG. 5) so that "future values" of traffic symbols may be used in averaging circuit 234. That is, calculation of the complex weighting coefficient is delayed until later-received symbols arrive, and the delay circuit ensures that the traffic channel symbol is multiplied by the proper complex weighting coefficient.

Note that the output of averaging circuit 234 is proportional to the gain of the traffic channel. This value, shown in FIG. 6 as $\alpha$, may be used as the final output of decision directed estimator 208 in FIG. 5. However, using this $\alpha$, which does not consider the noise in that particular traffic channel, results in the calculation of a sub-optimal value for the complex weighting coefficient. Therefore, to calculate a weighting coefficient that includes total noise, $\alpha$ is subtracted from values in a window of FIFO register 232 to produce the results shown in register 236, which represent noise values contained in the traffic channel symbols in the window of FIFO register 232.

Next, the values in register 236 are squared, as shown at register 238, and these squared values are averaged, as shown at averaging circuit 240. The output of averaging circuit 240 is $N_t$, which represents total noise. This total noise is coupled to square root function 242, which outputs the square root of $N_t$. Finally, output 244 of decision directed estimator 208 is a value representing the square root of $E_b$ divided by the square root of $N_t$.

Note that while $N_t$ is calculated from the traffic channel in this example, in an alternate embodiment $N_t$ may be calculated from pilot channel symbols in a manner similar to that shown in FIG. 6.

In the example of FIG. 5, deinterleaver and decoder 46 receives traffic channel symbols from a single finger. If a rake receiver is used for receiving multiple fingers, the symbols from each finger are summed prior to input into both deinterleaver and decoder 46 and decision directed estimator 210.

Figure 7:
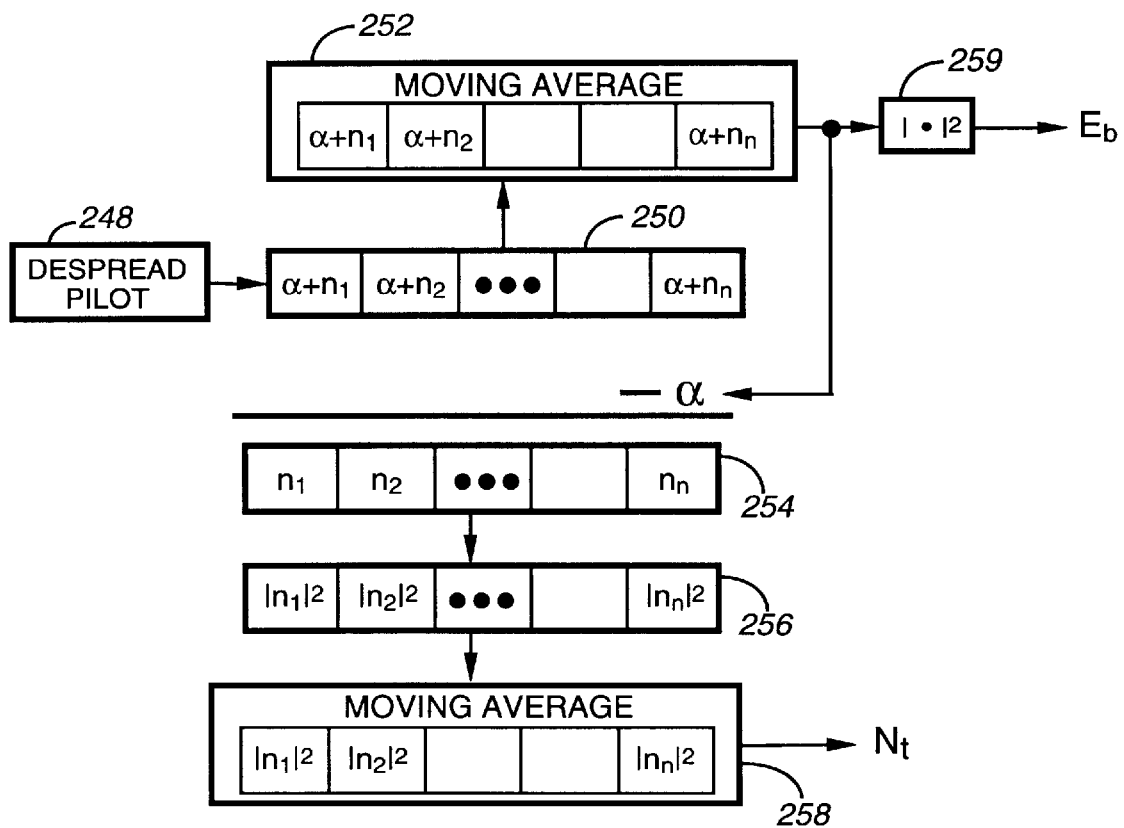
FIG. 7 is a block diagram of a circuit for calculating a channel quality in accordance with the method of the present invention.

With reference now to FIG. 7, there is depicted a block diagram of a circuit for calculating a channel quality in accordance with the method and system of the present invention. In a preferred embodiment, channel quality is measured as a signal-to-noise ratio of a pilot signal. In a preferred embodiment of a method and system for calculating a signal-to-noise ratio of a pilot signal, the pilot signal is despread, as shown at pilot despreader 248. The output of pilot despreader 248 is a sequence of symbols, each represented by the symbol α, and some associated noise, n. These symbol and noise values may be complex numbers.

After the pilot signal is despread, the symbols are stored in register 250, which may be implemented with a FIFO.

For each symbol time, a new average is calculated, as shown by the symbol α that is output from moving average circuit 252. The value α is then subtracted from each symbol in register 250, which leaves the noise values shown in register 254. The absolute value of these noise values are then squared, as shown in register 256. Thereafter, the values in register 256 are averaged, as shown at moving average circuit 258. The output of moving average circuit 258 is total noise, as represented by the symbol $N_t$.

Referring again to the output of moving average circuit 252, the absolute value of the output is squared, as shown at circuit 259. The output of circuit 259 is energy per bit, represented by the symbol $E_b$. The signal-to-noise ratio $E_b/N_t$ of the pilot signal can be calculated from the outputs of circuit 259 and moving average circuit 258.

Figure 8:
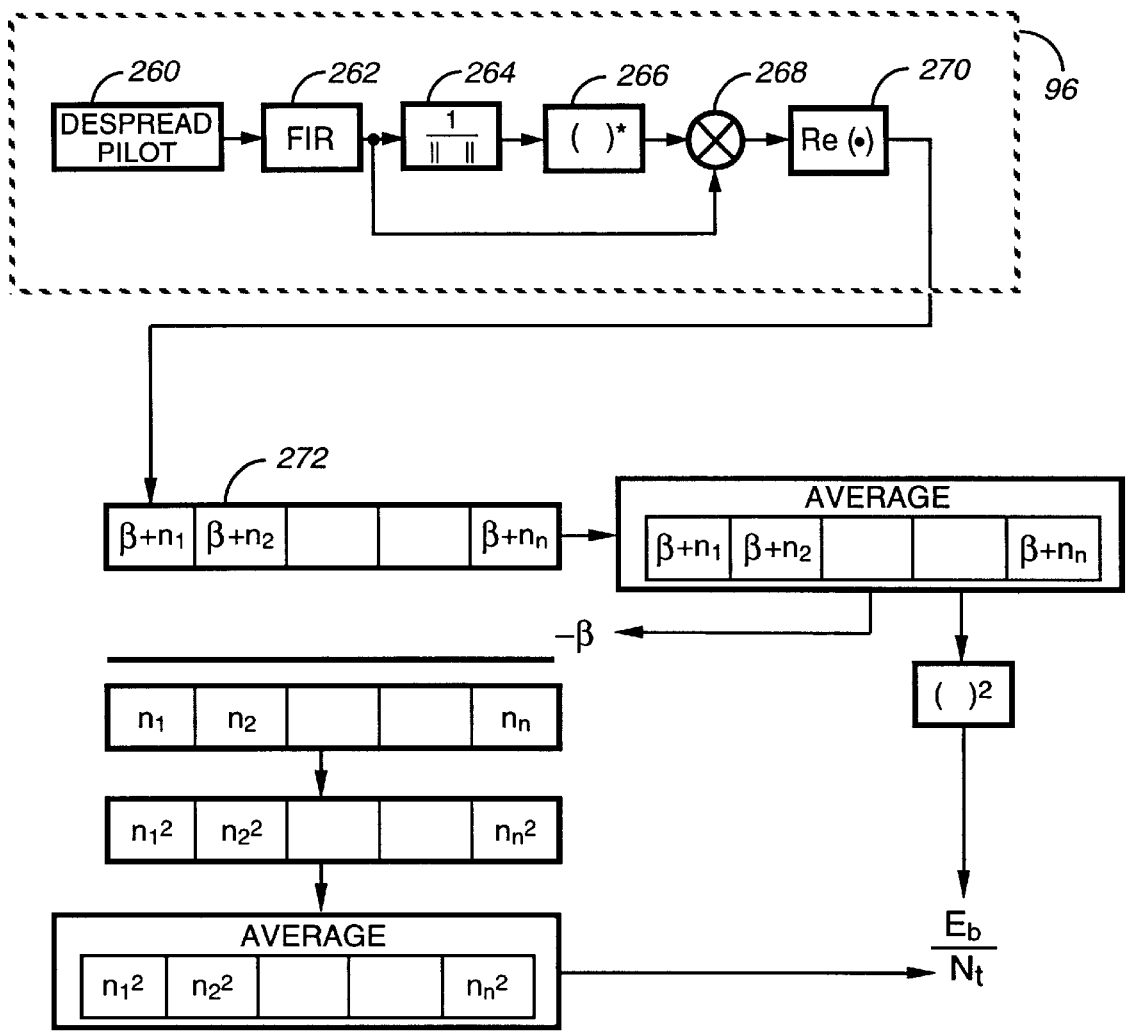
FIG. 8 is a block diagram of a circuit for calculating a channel quality in accordance with the method of the present invention.

With reference now to FIG. 8, there is depicted a block diagram of an alternate circuit for calculating channel quality in accordance with the method and system of the present invention. Like the circuit shown in FIG. 7, the circuit in FIG. 8 measures channel quality as a signal-to-noise ratio of a pilot signal.

As shown in the figure, the pilot signal is despread and filtered, as illustrated at despreader 260 and filter 262. Filter 262 is preferably implemented with a finite impulse response filter.

The output of filter 262 is coupled to amplitude normalizing function 264. Amplitude normalizing function 264 sets the amplitude of the pilot signal to unity.

The output of amplitude normalizing function 264 is coupled to complex conjugate function 266, which changes the sign of the imaginary part of the pilot signal symbols.

Multiplier 268 has inputs coupled to the output of complex conjugate function 266 and filter 262. The result of the multiplication that takes place in multiplier 268 is a pilot channel symbol having an angle rotated to compensate for the change in phase due to the channel.

The output of multiplier 268 is coupled to circuit 270 which extracts the real portion of the pilot channel symbols. The symbols are then loaded into register 272, which stores a number of symbols contained in a measurement group. These symbols are then processed as discussed above with reference to FIG. 5 in order to calculate a signal-to-noise ratio, $E_b$ divided by $N_t$.

The pilot signal quality measurement circuit 70 shown in FIG. 7 and FIG. 8 calculates the pilot signal quality based upon a single finger. In an alternate embodiment, multiple fingers may be used to calculate pilot signal quality.

Figure 9:
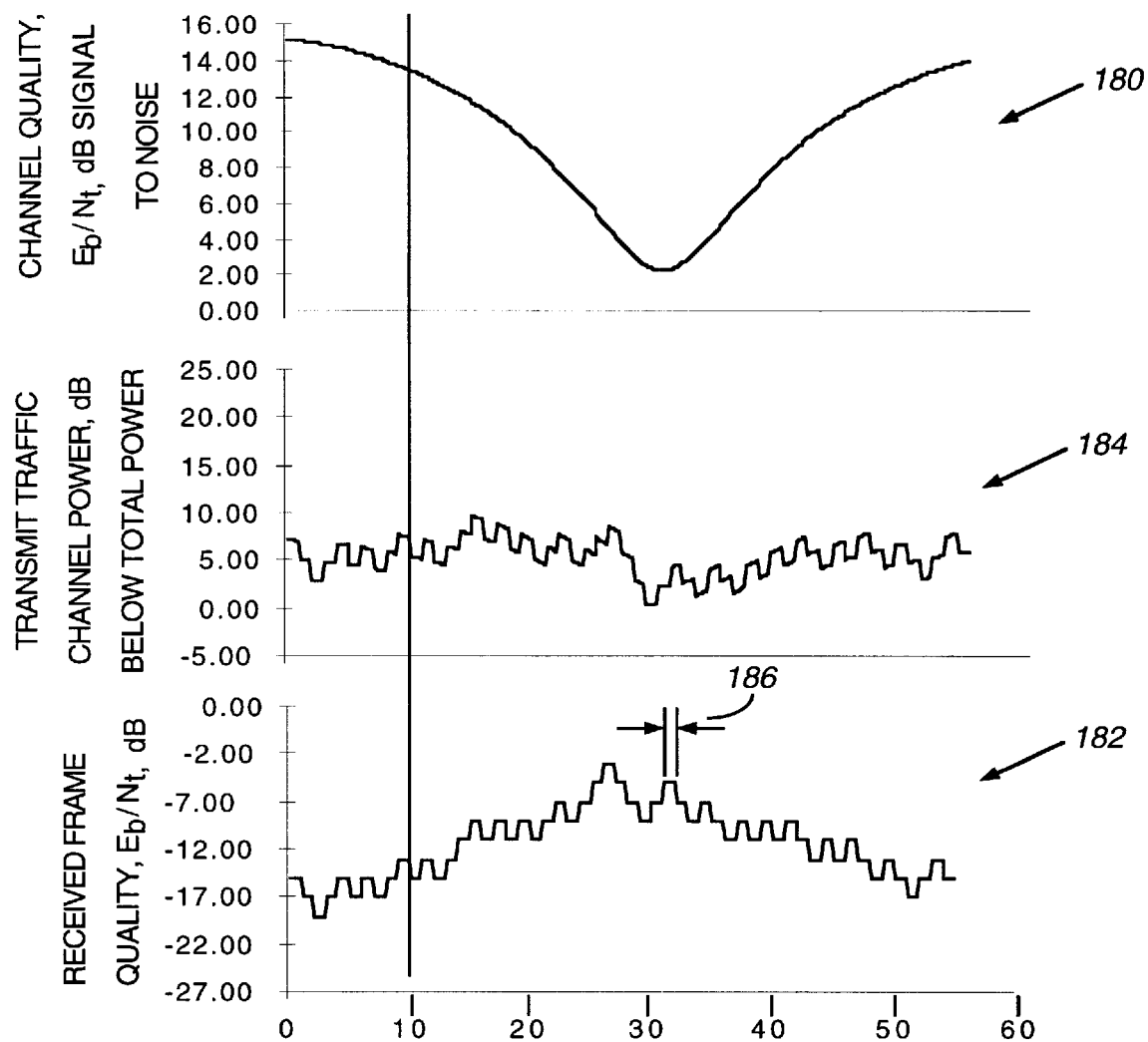
FIG. 9 depicts a set of graphs that illustrates the method of controlling traffic channel transmit power, and the relationships between channel quality, traffic channel transmit power, and received frame quality, in accordance with the method and system of the present invention.

With reference now to FIG. 9, there is depicted a set of graphs that illustrate the method of controlling traffic channel transmit power, and the relationships between channel quality, traffic channel transmit power, and received frame quality, in accordance with the method and system of the present invention. As illustrated, FIG. 9 includes channel quality graph 180, traffic channel transmit power graph 182, and received frame quality graph 184. The x-axis of each of these graphs shows measurement group numbers, which, in a preferred embodiment, correspond to 1.25 mS units of time, which represent one-sixteenth of a frame. The y-axis of channel quality graph 180 is a signal-to-noise ratio, expressed as $E_b/N_t$. According to an important aspect of the present invention, channel quality is measured as the pilot channel signal-to-noise ratio, $E_b/N_t$.

The y-axis of traffic channel transmit power graph 182 is power, in dB relative to the maximum power available at the transmitter. The y-axis received frame quality graph 184 is also signal-to-noise ratio, $E_b/N_t$. The duration of a measurement group is shown at reference numeral 186.

As shown in graph 180, the channel quality degrades over half the graph and then increases over the second half of the graph. As shown in graph 182, the transmit power is inversely proportional to the channel quality depicted in graph 180. As a result, the received traffic channel quality remains relatively constant. Thus, the goal of transmitting an adequate amount of power to communicate, the users traffic channel data has been achieved.

Figure 10:
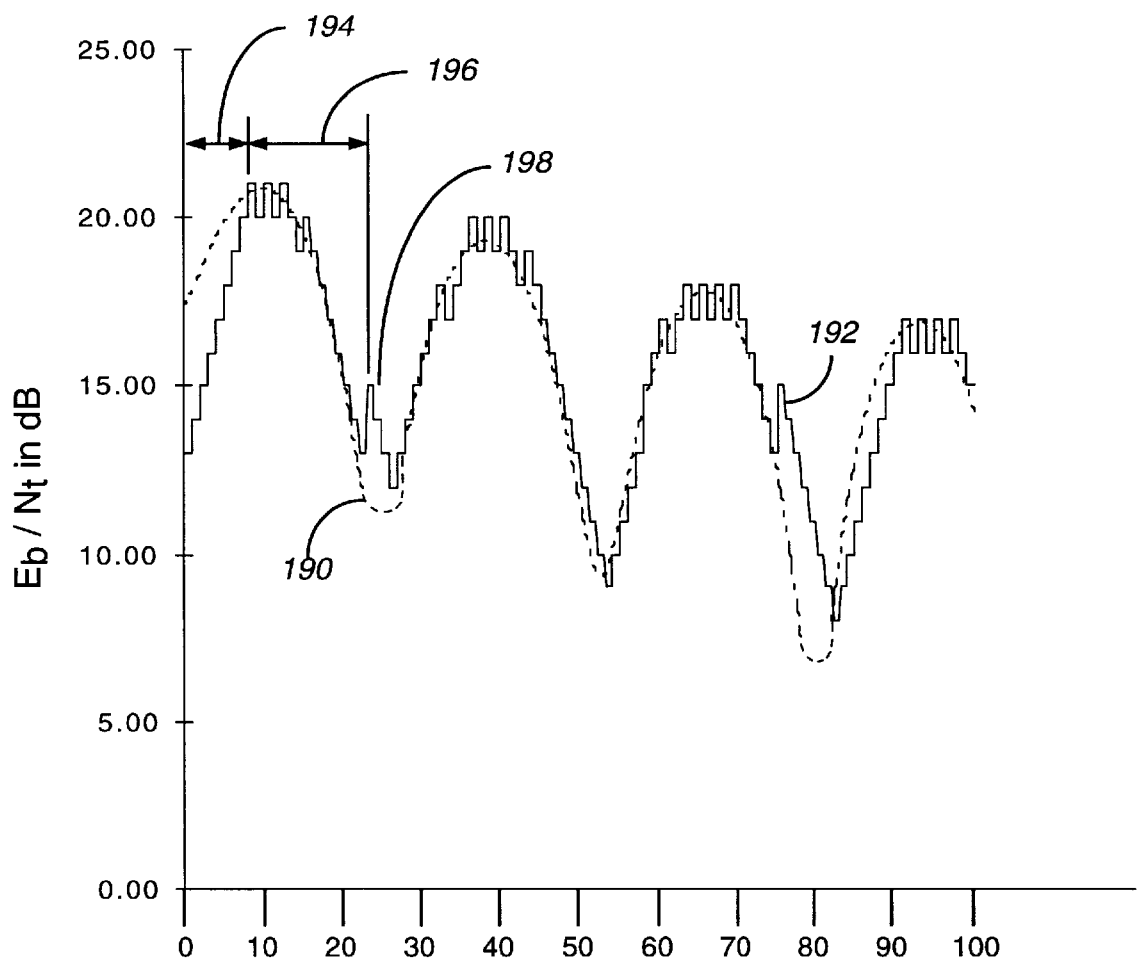
FIG. 10 is a graph that illustrates the relationship between channel quality and a channel quality threshold in accordance with the method and system of the present invention.

And finally, with reference to FIG. 10, there is depicted a graph that illustrates the relationship between channel quality and a channel quality threshold, in accordance with the method and system of the present invention. The x-axis shows a measurement group number, while the y-axis shows a signal-to-ratio, $E_b/N_t$, in dB. Reference numeral 190 indicates channel quality and reference numeral 192 indicates the channel quality threshold that is adjusted in response to channel quality 190.

In measurement groups 194, the inner control loop is adjusting the channel quality threshold in pursuit of a rising channel quality. In measurement groups 196, the channel quality threshold has approach the actual channel quality, and begins to track the channel quality as it declines. At reference numeral 198, the outer control loop has made a correction to the inner control loop. Corrections by the outer loop, such as those shown at 198, are made because the traffic signal quality deviates from a desired traffic signal quality. The abrupt adjustment in the channel quality threshold, as shown at reference numeral 198, causes the system to send a series of increase or decrease traffic channel power commands. The particular adjustment illustrated at reference numeral 198 causes the receiver to sent several increase-power commands in order to coincide with the new traffic channel threshold.

Note that each time traffic signal quality threshold 192 exceeds the actual traffic signal quality 190, an increase power command is sent from the receiver to the transmitter. Thus, adjustments, such as those shown at reference numeral 198, cause the receiver to send additional increase power commands to the transmitter—more increase power commands than would have been sent without the outer-loop adjustment.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A method in a wireless communication system for generating a power control command to control power of a transmitted traffic channel, the method comprising the steps of:

receiving a signal from a transmitter via a channel;

measuring a channel quality using the signal from the transmitter;

in response to the measured channel quality exceeding a channel quality threshold:

sending a decrease traffic channel power command to the transmitter; and increasing the channel quality threshold;

in response to the channel quality threshold exceeding the measured channel quality:

sending an increase traffic channel power command to the transmitter; and decreasing the channel quality threshold.

2. The method for generating a power control command according to claim 1 wherein the step of receiving a signal from a transmitter via a channel further includes receiving a pilot signal and a traffic signal from a transmitter via a channel, wherein the pilot and traffic signals are both modulated on a single carrier.

3. The method for generating a power control command according to claim 2 wherein the step of measuring a channel quality using the signal from the transmitter further includes measuring characteristics of the pilot signal.

4. The method for generating a power control command according to claim 3 wherein the step of measuring characteristics of the pilot signal further includes measuring a signal-to-noise ratio of the pilot signal.

5. The method for generating a power control command according to claim 2 further including the steps of:

measuring a traffic signal quality; and in response to a difference between the measured traffic signal quality and a traffic signal quality threshold, adjusting the channel quality threshold.

6. The method for generating a power control command according to claim 5 wherein the step of measuring a traffic signal quality further includes measuring a traffic channel signal-to-noise ratio.

7. The method for generating a power control command according to claim 5 wherein the step of adjusting the channel quality threshold further includes:

decreasing the channel quality threshold by the difference between the traffic signal quality threshold and the measured traffic signal quality in response to the measured traffic signal quality exceeding the traffic signal quality threshold; and increasing the channel quality threshold by the difference between the traffic signal quality threshold and the measured traffic signal quality in response to the traffic signal quality threshold exceeding the measured traffic signal quality.

8. The method for generating a power control command according to claim 5 further including the step of adjusting the traffic signal quality threshold in response to a history of loosing data in the traffic channel.

9. The method for generating a power control command according to claim 8 wherein the step of adjusting the traffic signal quality threshold in response to a history of loosing data in the traffic channel further includes:

increasing the traffic signal quality threshold in response to detecting a frame error; and decreasing the traffic signal quality threshold in response to detecting a good frame.

10. A system, in a wireless communication system, for generating a power control command to control power of a transmitted traffic channel comprising:

means for receiving a signal from a transmitter via a channel;

means for measuring a channel quality using the signal from the transmitter;

means for sending a decrease traffic channel power command to the transmitter, and means for increasing the channel quality threshold, in response to the measured channel quality exceeding a channel quality threshold; and means for sending an increase traffic channel power command to the transmitter, and means for decreasing the channel quality threshold, in response to the channel quality threshold exceeding the measured channel quality.

11. The system for generating a power control command according to claim 10 wherein the means for receiving a signal from a transmitter via a channel further includes means for receiving a pilot signal and a traffic signal from a transmitter via a channel, wherein the pilot and traffic signals are both modulated on a single carrier.

12. The system for generating a power control command according to claim 11 wherein the means for measuring a channel quality using the signal from the transmitter further includes means for measuring characteristics of the pilot signal.

13. The system for generating a power control command according to claim 12 wherein the means for measuring characteristics of the pilot signal further includes means for measuring a signal-to-noise ratio of the pilot signal.

14. The system for generating a power control command according to claim 11 further including:

means for measuring a traffic signal quality; and means for adjusting the channel quality threshold in response to a difference between the measured traffic signal quality and a traffic signal quality threshold.

15. The system for generating a power control command according to claim 14 wherein the means for measuring a traffic signal quality further includes means for measuring a traffic channel signal-to-noise ratio.

16. The system for generating a power control command according to claim 14 wherein the means for adjusting the channel quality threshold further include:

means for decreasing the channel quality threshold by the difference between the traffic signal quality threshold and the measured traffic signal quality in response to the measured traffic signal quality exceeding the traffic signal quality threshold; and means for increasing the channel quality threshold by the difference between the traffic signal quality threshold and the measured traffic signal quality in response to the traffic signal quality threshold exceeding the measured traffic signal quality.

17. The system for generating a power control command according to claim 14 further including means for adjusting the traffic signal quality threshold in response to a history of loosing data in the traffic channel.

18. The system for generating a power control command according to claim 17 wherein the means for adjusting the traffic signal quality threshold in response to a history of loosing data in the traffic channel further includes:

means for increasing the traffic signal quality threshold in response to detecting a frame error; and means for decreasing the traffic signal quality threshold in response to detecting a good frame.

\* \* \* \* \*